(12) United States Patent
Faubion

(10) Patent No.: US 7,132,653 B2
(45) Date of Patent: Nov. 7, 2006

(54) APPARATUS FOR VISUAL COMPARISON OF INFRARED IMAGES

(76) Inventor: Robert Carl Faubion, 7820 N. Valley Dr., Las Cruces, NM (US) 88005

( * ) Notice: Subject to any disclaimer, the term of this patent is extended or adjusted under 35 U.S.C. 154(b) by 175 days.

(21) Appl. No.: 10/753,617

(22) Filed: Jan. 7, 2004

(65) Prior Publication Data

US 2005/0145794 A1    Jul. 7, 2005

(51) Int. Cl.
    *G02F 1/00*    (2006.01)
(52) U.S. Cl. .................. 250/330; 250/353; 250/359.1; 348/49; 348/164; 348/588
(58) Field of Classification Search ............... 250/353, 250/359.1, 330; 348/588, 49, 164
See application file for complete search history.

(56) References Cited

U.S. PATENT DOCUMENTS

| 4,682,029 A | 7/1987 | Diepeveen et al. |
| 5,007,432 A | 4/1991 | Keller et al. |
| 5,011,243 A * | 4/1991 | Doyle et al. ................. 359/356 |
| 5,166,789 A * | 11/1992 | Myrick ........................ 348/144 |
| 5,478,151 A | 12/1995 | Duhrkoop |
| 5,708,857 A * | 1/1998 | Ishibashi ..................... 396/21 |
| 5,730,526 A | 3/1998 | Davis et al. |
| 5,942,753 A | 8/1999 | Dell |

* cited by examiner

*Primary Examiner*—Renee Luebke
*Assistant Examiner*—Mary Zettl
(74) *Attorney, Agent, or Firm*—Jeffrey D. Myers; Peacock Myers, P.C.

(57) ABSTRACT

A method and apparatus for visually observing thermal disparities between like vehicular components that are spatially separated. The invention uses only one infrared camera and one or more surfaces to reflect the thermal image of spatially separated components into the camera. The image generated by the infrared camera can be sent directly to a viewing apparatus or to a computer capable of controlling internal camera functions as well and providing video processing and analysis capabilities.

23 Claims, 2 Drawing Sheets

APPARATUS FOR VISUAL COMPARISON OF INFRARED IMAGES

BACKGROUND OF THE INVENTION

1. Field of the Invention (Technical Field)

The present invention relates to thermography. More particularly, the present invention relates to a method and apparatus for displaying more than one infrared image to permit visual comparison of objects within the field of view of the apparatus.

2. Description of Related Art

Note that the following discussion refers to a number of publications by authors and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Motor vehicle brake components play an essential role in contributing to safety on our nations highways. As such, several inventions have been developed to detect cold brake components which indicate that the brake is not functioning properly. The majority of theses inventions measure the gross thermal radiation emitted by everything contained within their field of view. For example, a prior art device focused at a wheel and brake assembly would be incapable of determining if the tire or the brake was overheating. This is because many prior art devices return only one gross radiation value for the entire area in the field of view. Since these devices are incapable of determining precisely what component is emitting the greatest amount of thermal radiation in their field of view, it is often desirable for them to have the smallest field of view possible, thus enabling the user to determine only the radiation of the component contained within the field of view of the device.

U.S. Pat. No. 5,942,753, to Dell, entitled "Infrared Remote Sensing Device and System for Checking Vehicle Brake Condition", discloses a device for determining the thermal condition of vehicle brakes. An infrared sensing device having two detectors measures infrared radiation being emitted by each brake. The measurements obtained are then sent to a computer which then displays two values representative of the measured radiation of the two brakes together with a video image of the truck taken by a conventional video camera.

U.S. Pat. No. 5,478,151, to Duhrkoop, entitled "Device for Detecting Excessively Heated Components or Locations in Moving Objects", discloses the use of an infrared beam detector and separate lenses, each aimed at a separate measuring point, as well as a movable mirror for alternately focusing the infrared beam on a single radiation detector.

U.S. Pat. No. 5,007,432, to Keller et al., entitled "Radiation Detection Method and Apparatus", discloses focusing beams of radiation from spatially separate areas of a human body onto a single radiation detector. The radiation detector preferably used is an infrared detector which produces an electrical output when a thermal differential is detected.

U.S. Pat. No. 4,682,029, to Diepeveen et al., entitled "Stereoscopic Infrared Imager Having a Time-Shared Detector Array", discloses a device which uses two mirrors, each capturing an infrared image, and two rotating mirrors that scan the fields of view provided by the two static mirrors and directs the radiation to a single radiation detector, the measured alternating temperature values then being displayed on separate display devices.

None of the devices of the aforementioned patents are capable of determining a radiation imbalance nor are they capable of creating and displaying a thermal image on a visual display apparatus. There is thus a present need for a method and apparatus which will enable more than one infrared image to be displayed on a viewing apparatus, thus enabling a user to quickly and easily perceive differences between the two thermal images and thereby not only determine which component has an unusual, unexpected or abnormal thermal signature, but also determine which specific area (and therefore which component) of the field of view has an irregular temperature.

BRIEF SUMMARY OF THE INVENTION

The present invention is directed to an infrared imaging apparatus for capturing a comparative thermal image of two separated viewing areas. The apparatus has a single infrared camera, a viewing or visual display apparatus, and one or more infrared image reflectors for directing the infrared image of at least two separated viewing areas to the camera for processing and transmission to the display apparatus for side-by-side presentation of the two or more areas to permit comparison of the thermal images of the two or more areas. The term "thermal image" is used to describe an image of objects in the camera field of view in the infrared spectrum.

The visual display apparatus may include a computer for controlling functions performed by the camera, performing visual image processing, as well as thermal image analysis. The visual images may be presented in real time. Each infrared image reflector may have at least one substantially flat, parabolic, or convex surface, the selection of which is within the skill of one having ordinary skill in the art.

The apparatus of the present invention preferably has a cooling apparatus and an enclosure. It is further preferable that the cooling apparatus have one or more thermoelectric coolers.

One advantage of the present invention is the visual presentation of a thermal image, not merely a measurement value of the gross or average temperature of the objects within the field of view. An image permits the user to perceive the objects and distinguish any temperature differences between objects within the field of view. For example, the visual image may portray the brakes, rim, and tire of the vehicle each having a distinct thermal image. Consequently, the user can distinguish which objects within the field of view are relatively hot or cold thereby indicating whether operation of the components is normal.

Another advantage of the present invention is the use of comparative thermal images obtained through a single camera and visually displayed in a side-by-side fashion for analysis. Using a single camera ensures that a slight error in adjustment of the many parameters that may be set for the camera will equally bias both images permitting accurate comparison.

The present invention is also directed to an apparatus for comparative viewing of an undercarriage of a vehicle to detect defects or anomalies in components thereof having an infrared camera mounted in an enclosure positioned beneath a vehicle undercarriage, a viewing apparatus disposed remotely from the enclosure for visually displaying side-by-side thermal images to permit comparison of undercarriage components within the field-of-view of the camera, and one or more infrared image reflectors mounted in the camera's field-of-view so disposed as to permit the camera to capture two spaced apart thermal images for transmission to the viewing apparatus. The visual display apparatus may be part of a computer system having a processor and software for controlling internal functions of the camera, performing visual image processing, and performing thermal image analysis.

It is preferable that the apparatus of the present invention be disposed in such a manner as to allow the camera to observe a left and right side of the vehicle's front or rear tire and brake assembly in a side-by-side manner.

The present invention also relates to a method for detecting defects or anomalies in the running gear of a vehicle while traveling in a relatively slow manner or in an at rest condition, such as at a highway vehicle weighing or inspection station. The method includes the steps of providing or positioning an infrared camera at a location so that a vehicle can pass over the camera, providing or positioning one or more infrared image reflectors within the field-of-view of the camera so as to enable the camera to capture the thermal image of two spaced apart vehicular components, adjusting the field-of-view of the one or more infrared image reflectors and camera so as to encompass left and right side vehicle running gear, processing and transmitting the thermal images to a visual display apparatus, and simultaneously displaying the thermal images from each side running gear so as to permit comparison of the heat characteristics thereof.

It is preferable that the field-of-view be adjusted so as to encompass left and right side brake and/or tire components of a vehicle.

The method of the present invention also preferably includes the step of providing a computer for performing visual image processing, thermal image analysis, and/or controlling internal functions of the camera.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

One preferred embodiment of the present invention is directed to an apparatus for visually displaying an infrared image of a plurality of vehicular components in a composite view. More particularly, the present invention is directed to the use of a single infrared camera for obtaining thermal images of a brake and other undercarriage components of a vehicle.

The term "vehicle" as used throughout the specification and claims is not limited simply to powered vehicles. Vehicles can include but are not limited to cars, trucks, semi-trucks, trailers having two or more wheels, and heavy equipment such as tractors, backhoes, etc. It may also include railway cars or other vehicles that move on tracks. The term "vehicular components" as used throughout the specification and claims is intended to mean any device, apparatus, or assembly connected to a vehicle. Such vehicular components may, but need not, be integral to the vehicle itself and can include but are not limited to brakes, tires, wheels, axle bearings, and gas tanks.

Figure 1:
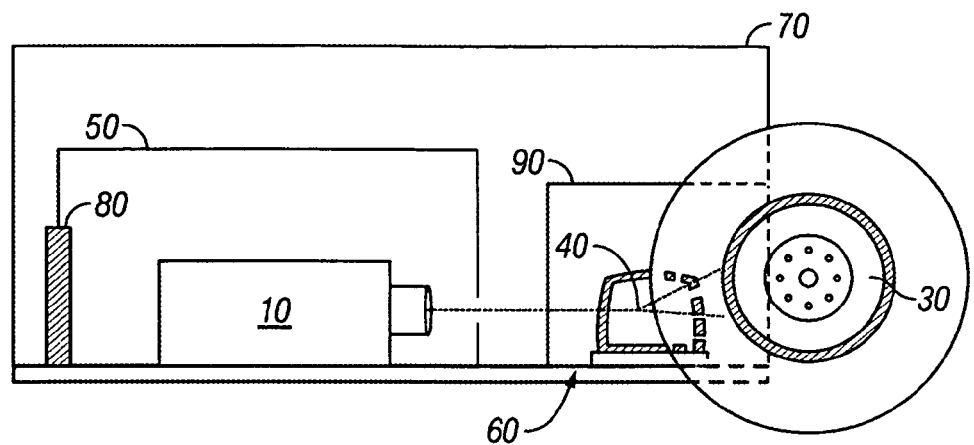
FIG. 1 is a schematic diagram of a side view of the present invention.
Figure 2:
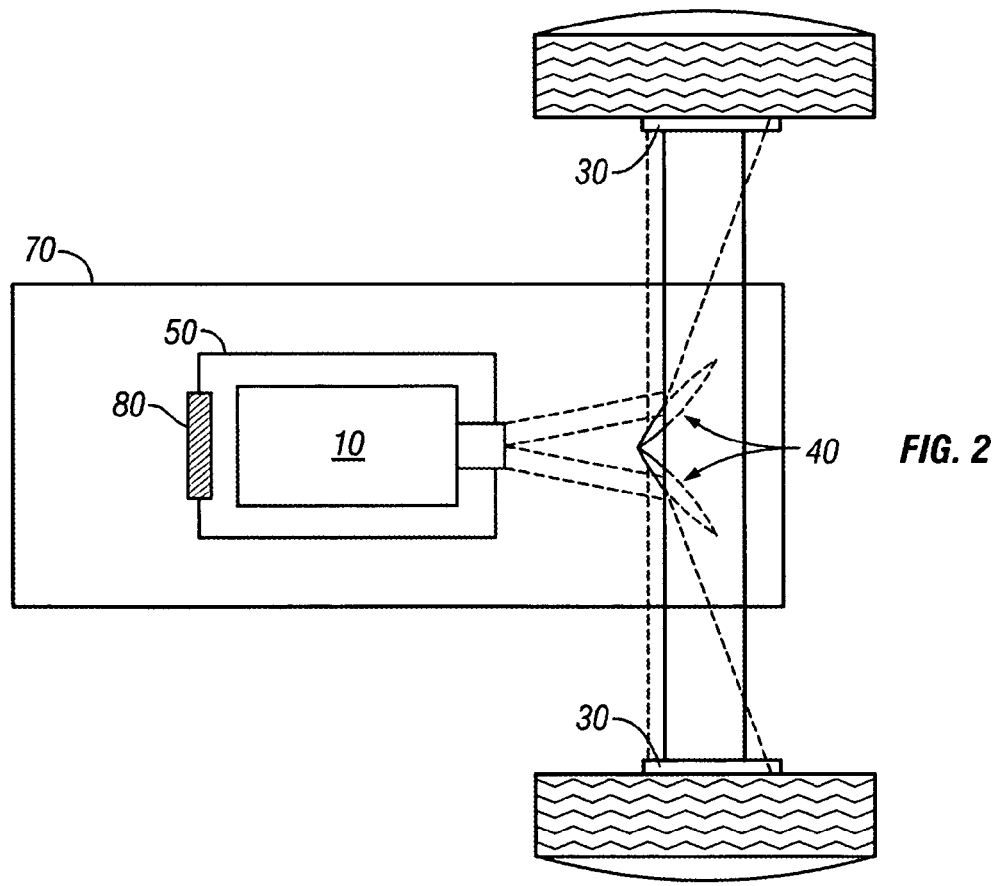
FIG. 2 is a schematic diagram of a top view of the present invention.

As depicted in FIGS. 1 and 2, the present invention is shown wherein infrared camera 10 is preferably disposed on base 60 spaced behind infrared image reflector(s) 40, such that infrared image reflector(s) 40 fill a substantial portion of the field of view of infrared camera 10, thus enabling camera 10 to observe images reflected from both infrared image reflector(s) 40. The infrared camera 10 may initially process the thermal images of the components within its field of view and can transmit the thermal image to a visual display apparatus such as a Cathode Ray Tube (CRT), flat screen display, or other display device. The display device may be part of a computer, such as an ordinary personal computer. If camera 10 is connected to the computer, then selected operating features of infrared camera 10 can be controlled with the computer from a remote location. The computer can further perform numerous image-processing functions as well as thermal image analysis with the aid of commercially available software packages.

Since the present invention is typically placed or positioned on a top surface of an asphalt road, infrared camera 10 can quickly reach excessive operating temperatures, particularly during warm weather conditions. It is therefore preferable that the present invention be equipped with cooling apparatus 80 which enables camera 10 to be maintained at temperature levels within its operating range. While virtually any type of cooling apparatus could be fashioned to achieve this objective, it is preferred that camera 10 be cooled with one or more thermoelectric coolers utilizing the Peltier effect. Examples of other cooling apparatus 80 which can produce desirable results include but are not limited to fans, adiabatic cooling apparatus, and liquid cooling apparatus.

While virtually any off-the-shelf infrared camera will produce desirable results, the infrared camera preferred provides different heat intensities by varying color intensities. Infrared camera 10 may be, for example, a Model A20, fully radiometric camera, manufactured by FLIR Systems, having an uncooled microbolometer detector.

It is also preferable that camera 10 be placed within camera enclosure 50, thus enabling cooled air to circulate around camera 10, as well as to minimize moisture and contaminate exposure. It is further preferable that the present invention be equipped with outer enclosure 70, thus protecting the invention from physical damage from unforeseen mishaps. While numerous materials could be used to achieve this objective, it is preferable that outer enclosure 70 be made from a rigid and durable material such as aluminum, stainless steel, steel, or a metal alloy. Since an objective of the present invention is to obtain thermal images of vehicular components it is therefore obviously necessary that outer enclosure 70 be equipped with one or more openings or thermally transparent sections 90 so that thermal images can pass to the inner recess of the enclosure.

While the present invention can easily be located in virtually any position and at virtually any angle, in order to view thermal images of various vehicular components, it is preferable that the present invention be disposed in such a manner that permits a vehicle to pass directly above the present invention.

In one application, the present invention is placed on or partially within a roadbed with camera 10 facing a direction substantially parallel with a vehicular lane of traffic. In this embodiment, infrared image reflector(s) 40 comprise a substantially v-shaped configuration, thus enabling camera 10 to observe a split-screen image wherein each of brake components 30 is observed side-by-side. While infrared image reflector(s) 40 can easily be manipulated to observe any combination of brake assemblies, it is preferable that infrared image reflector(s) 40 be disposed such that either both front brake assemblies are displayed simultaneously or both rear brake assemblies are displayed simultaneously rather than a front and rear brake located on a common side of the vehicle. This arrangement typically enables the user to detect a component failure with a greater degree of accuracy.

While infrared image reflector(s) 40 can be made from any material which exhibits sufficient reflectivity in the infrared spectrum, to enable camera 10 to observe thermal images reflected therefrom, it is preferable that infrared image reflector(s) 40 be made from aluminum, stainless steel, polished mild steel, copper, or a first surface mirror.

While the present invention preferably uses infrared image reflector(s) 40 that are removably positionable but not adjustable, the present invention is capable of producing desirable results with adjustable infrared image reflector(s) 40. It is preferred that non-adjustable infrared image reflector(s) 40 be made from one or more infrared image reflectors are preferably made from aluminum, stainless steel, polished mild steel, copper, a first surface mirror, or any combination thereof. The one or more infrared image reflectors can be adjustable. It is further preferred that the rigidity of this material contribute to the structural integrity of outer enclosure 70, by acting as an internal support between base 60 and outer enclosure 70. While any number of securing mechanisms could be used, It is preferable that removably positionable infrared image reflector(s) 40 be secured to base 60 with the use of L-brackets bolted to base 60 and reflector(s) 40.

If adjustable infrared image reflector(s) are to be used, virtually anyone of the near-infinite number of adjustment mechanisms available can be adapted by one reasonably skilled in the art to cause infrared image reflector(s) 40 to adjust. A few of these adjustment mechanisms may include, but are not limited to a rotatably adjustable fixture, a slidable wedge, a movable lock and key mechanism, an adjustable prop which permits tilting, an adjustable screw mechanism, a pivoting member having sufficient friction to maintain reflector(s) 40 in position after forcible movement, or any combination thereof. Any one of these adjustments could, obviously, be manipulated through the use of electric motors or physical human manipulation. Infrared image reflector(s) 40 can be capable of both horizontal and vertical adjustment. While a maximum degree of horizontal adjustment will obviously produce more desirable results, it is desirable that infrared image reflector(s) 40 be horizontally adjustable from at least between about 50 degrees to about 135 degrees. While a maximum degree of vertical adjustment will obviously produce more desirable results, it is desirable that infrared image reflector(s) 40 be vertically adjustable from at least between about 0 degrees to about 45 degrees above horizontal into camera 10. The use of adjustable reflectors not only enables the present invention to obtain thermal images of brake components for vehicles of various sizes, but also enables the present invention to obtain thermal images of other components of a vehicle without replacing reflector(s) 40. Although the drawings depict a v-shaped reflector, other reflector designs are also capable of producing desirable results. These reflector designs include, but are not limited to, flat, convex, and parabolic-shaped reflectors.

Since the present invention is capable of producing a large field of view, a user can observe the comparative thermal images of a number of vehicular components simultaneously. This enables the user to determine precisely which of a number of different components may be malfunctioning.

Another embodiment of the present invention utilizes reflector(s) 40 disposed in such a manner as to enable camera 10, to observe a large area of the under-carriage of a vehicle. In this embodiment, the present invention can thus allow a user to detect such things as hidden compartments within various components of the vehicle. For example, a hidden compartment within the gas tank of a vehicle can be detected due to the thermal disparity between the two areas.

One of the benefits of using the setup depicted in FIGS. 1 and 2 is that since camera 10 is observing two separate vehicular components side-by-side, the present invention is capable of producing desirable results even when the images are out of focus or when camera 10 is in need of adjustment. This is because both images will be proportionally out of focus and thus a user, observing the images side-by-side on a display device, will still be able to observe a difference between the two images, thus indicating a thermal imbalance and a defective component.

Figure 3:
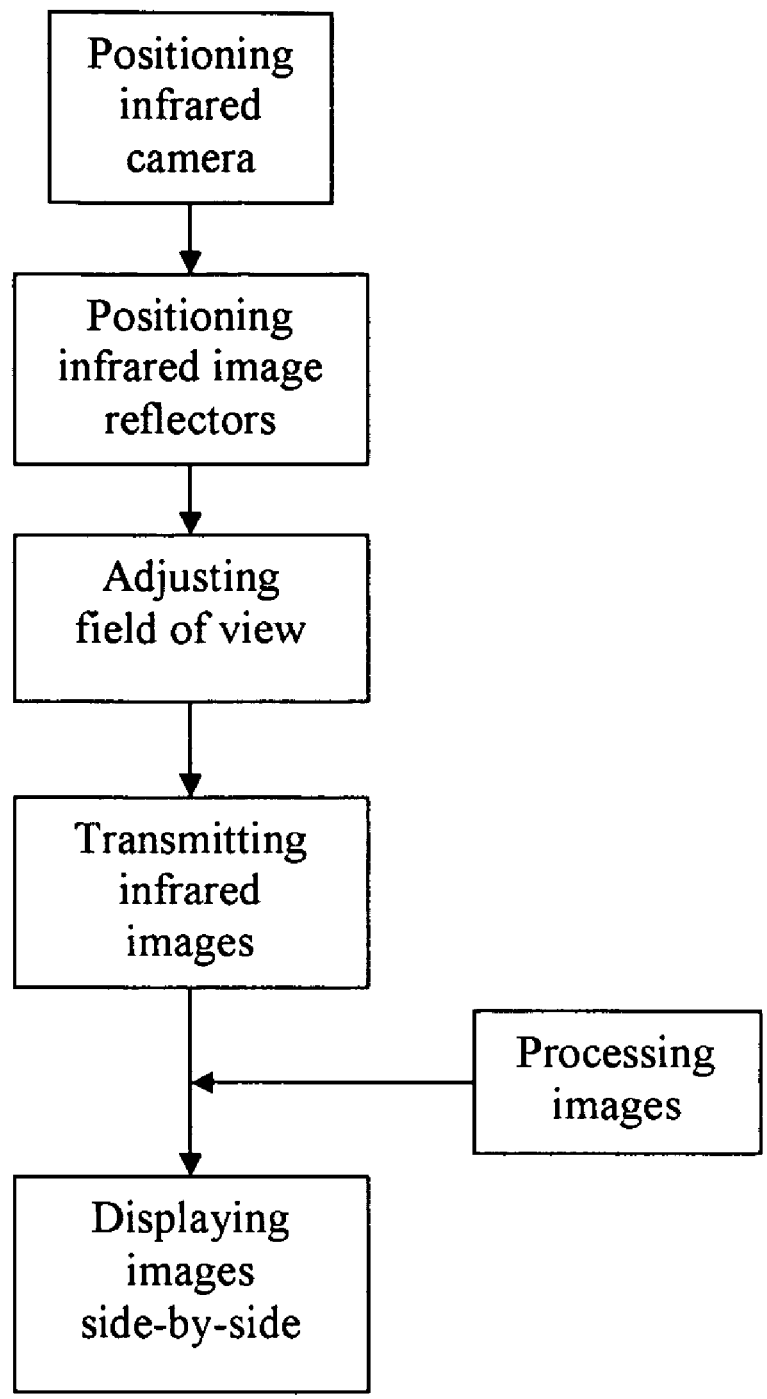
FIG. 3 is a block diagram depicting the steps of the method of the present invention.

Referring now to FIG. 3, the method of the present invention has the steps of positioning the infrared camera, positioning the infrared image reflectors, adjusting the field of view, transmitting the infrared images, and visually displaying the images side-by-side. As depicted in FIG. 3, the present invention can have the additional step of processing the images. This step should occur between the steps of transmitting the infrared images and displaying the infrared images.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for comparative viewing of an undercarriage of a vehicle to detect defects or anomalies in components thereof comprising:

an infrared camera mounted in an enclosure positioned beneath a vehicle undercarriage for capturing thermal images of selected portions of said undercarriage within the field of view of said camera;

one or more infrared image reflectors mounted in said camera field-of-view so disposed as to permit said camera to capture two spaced apart thermal images for transmission to a viewing apparatus; and said viewing apparatus disposed remotely from said enclosure for visually displaying side-by-side thermal infrared images to permit comparison of said images of undercarriage components within the field-of-view of said camera.

2. The apparatus of claim 1 wherein said viewing apparatus comprises a computer.

3. The apparatus of claim 2 wherein said computer controls selected functions of said camera.

4. The apparatus of claim 2 wherein said computer performs image analysis.

5. The apparatus of claim 2 wherein said computer performs thermal image processing.

6. The apparatus of claim 1 wherein said camera and said infrared image reflectors are disposed in such a manner as to allow said camera to observe a left and right side of the vehicle's front or rear tire and brake assembly in a side-by-side manner.

7. The apparatus of claim 1 wherein said one or more infrared image reflectors comprise a material selected from a list consisting of aluminum, stainless steel, polished mild steel, copper, a first surface mirror, and any combination thereof.

8. The apparatus of claim 1 wherein said one or more infrared image reflectors are adjustable.

9. The apparatus of claim 1 wherein said one or more infrared image reflectors comprise one or more shapes selected from a list consisting of a parabolic surface, a flat surface, a convex surface, and combinations thereof.

10. The apparatus of claim 1 wherein said one or more infrared image reflectors have a vertical field of view of at least 45 degrees above horizontal.

11. The apparatus of claim 1 wherein said one or more infrared image reflectors have a horizontal field of view of at least 90 degrees centered on an axis orthogonal to an axis of said camera positioned in a horizontal plane.

12. A method for detecting defects or anomalies in running gear of a vehicle comprising the steps of:
positioning an infrared camera at a location so that a vehicle can pass over the camera;
positioning one or more infrared image reflectors within the field-of-view of the camera so as to enable the camera to capture the thermal image of two spaced apart vehicular components;
adjusting the field-of-view of the one or more infrared image reflectors and camera so as to encompass left and right side running gear;
transmitting the thermal images to a viewing apparatus; and
simultaneously displaying the thermal images from each side running gear so as to permit comparison of the heat characteristics thereof.

13. The method of claim 12 wherein the step of adjusting the field-of-view comprises adjusting the field-of-view of the one or more infrared image reflectors and camera so as to encompass left and right side brake components.

14. The method of claim 13 further comprising the step of providing a computer.

15. The method of claim 14 further comprising the step of performing thermal image processing with the computer.

16. The method of claim 14 further comprising the step of performing visual image analysis with the computer.

17. The method of claim 14 further comprising the step of controlling selected functions of the camera with the computer.

18. The method of claim 14 further comprising the step of simultaneously displaying comprises simultaneously displaying an image with the use of at least one computer.

19. The method of claim 12 wherein the step of positioning one or more infrared image reflectors comprises positioning one or more infrared image reflectors having at least one substantially flat surface.

20. The method of claim 12 wherein the step of positioning one or more infrared image reflectors comprises positioning one or more infrared image reflectors having at least one substantially parabolic surface.

21. The method of claim 12 wherein the step of positioning one or more infrared image reflectors comprises positioning one or more infrared image reflectors having at least one substantially convex surface.

22. The method of claim 12 wherein the adjusting step comprises adjusting the field-of-view of the one or more infrared image reflectors and camera so as to encompass left and right side running gear.

23. The method of claim 12 wherein the adjusting step comprises adjusting the one or more infrared image reflectors such that a horizontal field of view of at least 90 degrees centered on an axis orthogonal to the camera axis in the horizontal plane is achieved.

* * * * *